Patented Aug. 25, 1936

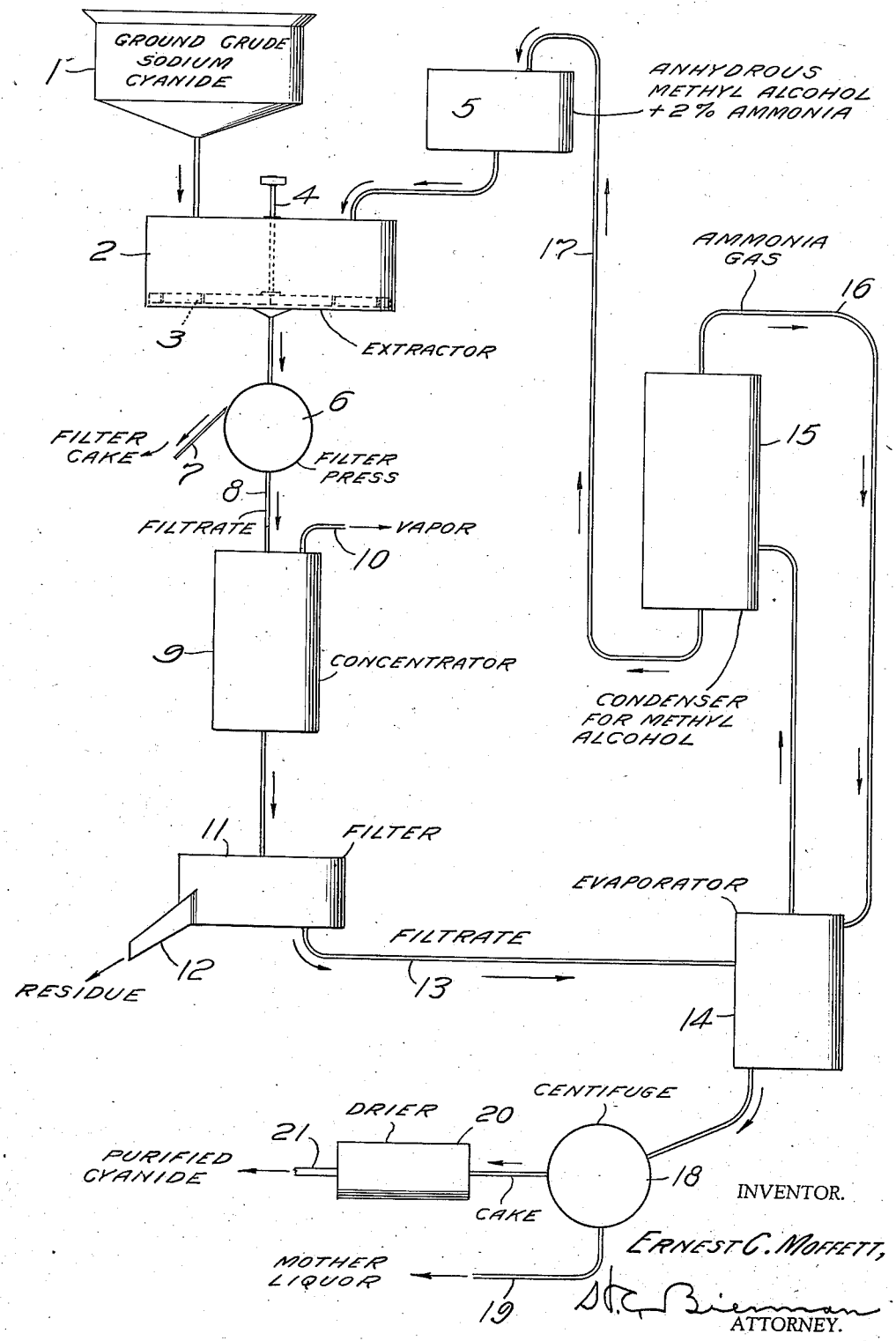

2,052,418

UNITED STATES PATENT OFFICE 2,052,418

MANUFACTURE OF SODIUM CYANIDE

Ernest C. Moffett, Woodbridge, N. J., assignor to American Cyanamid Company, New York, N. Y., a corporation of Maine Application February 17, 1934, Serial No. 711,659

6 Claims. (Cl. 23—84)

This invention relates to the purification of crude alkali metal cyanides, more particularly to the use of suitable solvents and to a procedure for such purification.

This invention is adapted for use in producing high grade alkali metal cyanides from low grade cyanides and also for producing high grade alkali metal cyanides from crude alkali earth metal cyanides.

As is well known a crude calcium or sodium cyanide containing approximately 50% of cyanide may be readily and economically made in a simple furnace operation by the fusion or heat treatment of calcium cyanamid with a suitable alkali metal salt such as sodium chloride, sodium carbonate and the like. This product is of considerable importance as it is adapted to be used in place of pure cyanides for most purposes, but in some cases it is desirable that this product be converted into a pure form. The present invention has resulted in a process whereby such crude calcium cyanide or crude sodium cyanide or the like may be readily and effectively converted to a high grade material, such as the 96% sodium cyanide which is now a standard for high grade cyanides.

It has been well known that certain materials have a solvent action on sodium cyanide, but do not dissolve the usual impurities associated therewith. For example, it was known that methyl alcohol in the anhydrous state could be used to dissolve alkali metal cyanides and the solution was evaporated to dryness to recover the purified cyanide. It was also well known that anhydrous ammonia is a good solvent and a process has been proposed involving the use of anhydrous ammonia under pressure for the recovery of purified cyanide by solution of the crude cyanide in and subsequent evaporation of the ammonia.

The present process is based upon the solvent action of methyl alcohol upon alkali metal cyanides, the result of which is a solution of the cyanide in the alcohol. However, instead of evaporating the solution to dryness I evaporate the same to such a point that crystallization of the purified cyanide begins to take place and then filter the high grade purified cyanide from the mother liquor.

Another feature of my invention, which is of considerable importance, is the use of means whereby azulmic decomposition of the cyanide during the evaporation stage is prevented. I have found that in the presence of an anhydrous, volatile base, such as anhydrous ammonia, the evaporation may be conducted so as to give high grade cyanide without decomposition or discoloration of the product. While the presence of the ammonia is essential only in the evaporation stage of the process, it is perfectly feasible to add a small amount of anhydrous ammonia to the methyl alcohol used in the first stage of the process. Usually the amount of ammonia present in the methyl alcohol is less than 10% and I have found that approximately 2% of ammonia is sufficient for my purpose. When ammonia is added to the methyl alcohol I not only avoid the danger of decomposition of cyanide throughout all the stages of the operation, but I also materially increase the solubility of the cyanide in the methyl alcohol.

As the raw material for my operation I may take a sodium cyanide, for example, made by the reaction between soda ash and ammonia in the presence of an iron catalyst. Or, I may take the reaction product of crude calcium cyanamid with dry sodium carbonate. Other sources of the crude cyanide to be treated by my proposed process may be utilized.

My invention is illustrated by the accompanying drawing which is a flow sheet illustrating an apparatus which may be used for practicing the invention.

I provide a bin 1 in which the crude sodium cyanide, for example, ground to the desired degree of fineness, is stored. The crude cyanide is introduced into the closed vessel 2, provided with a stirrer 3 at the bottom thereof which is rotated by a suitable source of power connected to shaft 4. In tank 5 is the solvent consisting of methyl alcohol containing about 2% of anhydrous ammonia, which is introduced by suitable piping into the vessel 2 and the stirrer is rotated causing agitation and intimate mixing of the methyl alcohol with the cyanide, whereby extraction of the sodium cyanide is obtained without solution of any substantial amount of the associated impurities. The mixture is then fed to the filter press 6 which may be of the rotating type, and the filter cake removed by scraper 7.

The remaining solution 8 containing the sodium cyanide is introduced into concentrator 9 where, by gentle heating, some of the solvent is vaporized, the vapors being taken off by pipe 10 and condensed for reuse. In the concentrator, evaporation is conducted to a point where the sodium cyanide just begins to crystallize out. At this point any substances, such as compounds of lime which may have been dissolved in small quantities in the methyl alcohol, are precipitated out. The mixture is then fed to the filter 11, the insoluble material being taken off as shown diagrammatically at 12.

The filtrate which consists substantially of the solvent with the sodium cyanide and perhaps a small amount of caustic alkali is now introduced through pipe 13 into evaporator 14. In the evaporator the solution is heated so as to drive off the major part of the solvent, the vapors being condensed in condenser 15. Ammonia gas is generated and it is caused to circulate through pipe 16 from the condenser to the evaporator in order to maintain an atmosphere of ammonia within the evaporator. This is essential in order to prevent the azulmic decomposition of the sodium cyanide at the temperature of the operation. While the amount of solvent evaporated may be varied I have found that good efficiency is obtained if approximately 90% of the solvent is removed in this operation. In any case it is desirable that the amount of solvent be taken off which allows the crystallization of a sodium cyanide containing at least 96% of sodium cyanide. The amount of evaporation necessary for obtaining such a product is of course dependent upon the amount of the caustic alkali or the like which is present in the solution. If the amount thereof is very small then a very large proportion of the solvent may be evaporated and vice versa, resulting in all cases in a high grade product.

The resulting mixture is then led into the centrifugal separator 18 and the remaining solution or mother liquor is removed through pipe 19. It may be utilized in the process by adding it either to the methyl alcohol contained in tank 5 or by introducing it into the extractor 2, or if desired the solution may be evaporated to give an intermediate grade of sodium cyanide. The filter cake from the centrifuge 18 is introduced into dryer 20 where a gentle heat and preferably, though not necessarily, a vacuum is applied to remove the remainder of the solvent. The purified sodium cyanide is removed from the dryer as shown diagrammatically at 21.

From the above it will be noted that my invention includes several novel features. First it utilizes the protective effect of a volatile base, such as ammonia, to prevent decomposition of cyanide during the procedure. Second, it involves evaporation of part of the solvent in order to allow crystallization of the purified cyanide. It also includes a preliminary concentration to cause precipitation of minor amounts of impurities which may be present therein.

I am aware that it has been proposed to extract a crude alkali metal cyanide by means of a mixture of ethyl alcohol and anhydrous ammonia. However, the proposed process did not utilize the ethyl alcohol as a solvent, but utilized it as a diluent and the ammonia was the solvent. In the present case ammonia is not depended upon as the solvent, but the methyl alcohol is used for this purpose. In the proposed process the resulting solution was evaporated only to the extent that the ammonia was removed, and the ethyl alcohol remained. In the present process the methyl alcohol is evaporated to cause crystallization of the cyanide.

Although I have described my invention setting forth a specific embodiment thereof and describing the operation for the production of sodium cyanide, it is obvious that other alkali metal cyanides may be purified by my procedure. It will also be apparent to those skilled in the art that the intermediate concentration of the solution to remove certain minor impurities may be dispensed with under certain conditions, such as the absence of soluble impurities or the lack of necessity for removing the same from the final product. In place of ammonia other volatile bases may be used for their protective action on the cyanide and the amount of ammonia or other volatile base may be varied within wide limits with good results. One or more of the filtration steps may be omitted or they may be combined with good results. These and various other changes in apparatus and in procedure may be made without departing from the spirit of my invention, the scope of which is defined in the claims appended hereto.

What I claim is:

1. A method of purifying crude alkali metal cyanides which comprises providing anhydrous methyl alcohol as a solvent, adding thereto a small amount of substantially anhydrous ammonia sufficient to prevent azulmic decomposition of said cyanide during heating, dissolving said cyanide in said mixture, and evaporating said mixture by heat under a sufficient partial pressure of dry ammonia to prevent azulmic decomposition to recover purified cyanide.

2. A method of purifying crude alkali metal cyanides which comprises providing anhydrous methyl alcohol as a solvent, adding thereto less than 5 percent of substantially anhydrous ammonia sufficient to prevent azulmic decomposition of said cyanide during heating, dissolving said cyanide in said mixture, and evaporating said mixture by heat under a sufficient partial pressure of dry ammonia to prevent azulmic decomposition to recover purified cyanide.

3. A method of purifying crude alkali metal cyanides which comprises providing anhydrous methyl alcohol as a solvent, adding thereto about 2 percent of substantially anhydrous ammonia sufficient to prevent azulmic decomposition of said cyanide during heating, dissolving said cyanide in said mixture, and evaporating said mixture by heat under a sufficient partial pressure of dry ammonia to prevent azulmic decomposition to recover purified cyanide.

4. A method of purifying crude alkali metal cyanides which comprises providing anhydrous methyl alcohol as a solvent, adding thereto a small amount of substantially anhydrous ammonia sufficient to prevent azulmic decomposition of said cyanide during heating, dissolving said cyanide in said mixture, partially evaporating said mixture by heat under a sufficient partial pressure of dry ammonia to prevent azulmic decomposition and filtering to recover purified cyanide.

5. A method of purifying crude alkali metal cyanides which comprises dissolving said cyanide in anhydrous methyl alcohol, filtering off the undissolved impurities and evaporating the solution by heat in the presence of a sufficient partial pressure of dry ammonia to prevent azulmic decomposition to produce purified cyanide.

6. A method of purifying crude alkali metal cyanides which comprises dissolving said cyanide in anhydrous methyl alcohol and evaporating the solution by heat in the presence of a sufficient partial pressure of dry ammonia to prevent azulmic decomposition to produce purified cyanide.

ERNEST C. MOFFETT.